United States Patent
Aiello et al.

(10) Patent No.: US 11,429,748 B2
(45) Date of Patent: Aug. 30, 2022

(54) DEVICE AND METHOD FOR ANALYZING PERFORMANCES OF A WEB APPLICATION

(71) Applicant: BULL SAS, Les Clayes-sous-Bois (FR)

(72) Inventors: Damien Aiello, La Buisse (FR); Wajih Chaabane, Chambery (FR); Bruno Demeilliez, Saint Laurent du Pont (FR)

(73) Assignee: BULL SAS, Les Clayes-sous-Bois (FR)

( * ) Notice: Subject to any disclaimer, the term of this patent is extended or adjusted under 35 U.S.C. 154(b) by 81 days.

(21) Appl. No.: 16/928,097

(22) Filed: Jul. 14, 2020

(65) Prior Publication Data
US 2021/0019446 A1 Jan. 21, 2021

(30) Foreign Application Priority Data
Jul. 15, 2019 (FR) ...................................... 1907976

(51) Int. Cl.
*G06F 21/62* (2013.01)
*H04L 9/40* (2022.01)
*H04L 67/02* (2022.01)

(52) U.S. Cl.
CPC ...... *G06F 21/6254* (2013.01); *H04L 63/0421* (2013.01); *H04L 67/02* (2013.01)

(58) Field of Classification Search
CPC .. G06F 21/6254; H04L 63/0421; H04L 67/02
See application file for complete search history.

(56) References Cited

U.S. PATENT DOCUMENTS

| | | | |
|---|---|---|---|
| 7,970,946 B1 | 6/2011 | Djabarov et al. | |
| 2003/0163608 A1 | 8/2003 | Tiwary et al. | |
| 2018/0373885 A1 | 12/2018 | Arad et al. | |
| 2020/0021568 A1 * | 1/2020 | Becher | H04L 9/083 |

FOREIGN PATENT DOCUMENTS

| | | | | |
|---|---|---|---|---|
| WO | 2014116291 A1 | | 7/2014 | |
| WO | WO-2016173615 A1 * | 11/2016 | .......... | G06F 11/3428 |

* cited by examiner

*Primary Examiner* — Arvin Eskandarnia
(74) *Attorney, Agent, or Firm* — Arc IP Law, PC; Joseph J. Mayo (57) ABSTRACT

The invention relates to a device and a method for analyzing performances of a web application capable of performing a process of on-the-fly anonymization (400) of production data, said production data being generated following a benchmark request message (MR1, MR2') transmitted to said web application, said anonymization process (400) being carried out by a first electronic communication device (10) capable of
Identifying, from a sensitive data identification repository (14), data to be anonymized in the response message (MRR1, MRR2);
Generating, from an anonymization repository (15), anonymized data from previously identified data to be anonymized; and
Generating, from the anonymized data and from the response message (MRR2), an anonymized response message (MRR2').

15 Claims, 3 Drawing Sheets

DEVICE AND METHOD FOR ANALYZING PERFORMANCES OF A WEB APPLICATION

The present invention relates to the field of performance tests on computing infrastructures and application chains. More specifically, the invention relates to a method and a system for analyzing performances of a web application allowing the management of confidential and/or sensitive data.

PRIOR ART

Performance tests (also known as "benchmarks") can have numerous objectives such as sizing an infrastructure necessary for an application, validating the performances, the endurance, the robustness of an application, or even identifying existing problems in an application.

Benchmark applications (or software) make it possible in particular to simulate several users simultaneously. For example, for a Web application computer infrastructure (a network of Web servers), the benchmark application should be capable of sending to the computing infrastructure a very large number of requests (for example in HTML format), as if they originated from different simultaneous users.

These applications make it possible to create one or more test scenarios by choosing one or more request categories to be executed by the application tested and by choosing a request rate for each scenario. Test applications perform a certain number of measurements (infrastructure response time, error rate, or other) and generate a test report.

In general, a computing infrastructure performance test can be carried out across several steps. In a first step, the test strategy is defined, notably with the definition of the technical context of the architecture tested, the choice of one or more scenarios and the weighting of these scenarios (i.e. the definition of the relative importance of each compared to the others), the determination of the target volume (i.e. the desired request rate for the test), the determination of the types of requests to be sent according to the objectives of the test, and the definition of the architecture tested.

Then, the test environment is set up. This involves for example applying a certain configuration to the computer architecture tested in order to be able to test this particular configuration.

Next, the test scenarios are defined by means of test applications (for example JMeter®) and then modified to be configurable. Then, from these definitions, the instruction injection sets are constructed. This involves defining the parameters of the requests to be sent to the infrastructure tested in order to implement the scenarios. Scheduling scripts are then generated to execute chronologically the tasks necessary for carrying out requests according to the injection sets. Finally, the requests are executed during a "shot campaign" and the results are measured and analyzed to generate a report.

Thus, to carry out these performance tests, it is necessary to have a large enough dataset in order to test the application. To do this, a first solution would be to use the production data of the application in order to carry out such performance tests. However, using such production data may prove impossible, notably when these latter contain sensitive and/or confidential information which may not be communicated to third-parties. It is then common practice to create a test dataset in order to be able to carry out performance tests whilst respecting the data confidentiality rules imposed by European regulations.

However, creating a test dataset may prove to be very complex and time-consuming due to the volume required in order to perform such tests, but also due the complexity of modifying the original data in order to comply with confidentiality standards. Solutions have been developed (US2018/373885 or WO2014/116291) in order to guarantee data confidentiality. Thus, these solutions implement obfuscation of confidential data using an obfuscated identifier in order to form obfuscated representations of the data. However these solutions do not make it possible to guarantee the confidentiality of the production data but of the result data, moreover, these solutions result in a relatively long response time and are therefore conducive to the phenomenon of overhead (or excess time).

Currently, the known solutions do not make it possible to test the application using production data, there is therefore a need for new solutions making it possible to use production data to carry out performance tests whilst guaranteeing the confidentiality and consistency of these data.

Technical Problem

The object of the invention is therefore to overcome the shortcomings of the prior art. In particular, the object of the invention is to propose a method for analyzing performances of a web application comprising a process of on-the-fly anonymization of production data, said method making it possible to ensure the confidentiality of sensitive data of said production data whilst using all of the production data to carry out the performance tests.

A further object of the invention is to propose a device for analyzing performances of a web application, said device making it possible to carry out performance tests from production data, within the context of web applications, whilst ensuring the anonymization of sensitive data of said production data.

BRIEF DESCRIPTION OF THE INVENTION

For this purpose, the invention relates to a method for analyzing performances of a web application comprising a process of on-the-fly anonymization of production data in particular being sent to a third electronic device, said production data being generated following a benchmark request message, preferably from the third electronic device, transmitted to said web application,
said anonymization process being carried out by a first electronic communication device comprising a processing unit, a communication means, and a data memory configured to store a sensitive data identification repository and an anonymization repository,
said process of on-the-fly anonymization of production data of the web application comprising:
  a step of reception, by the communication means, of a response message to the benchmark request message, following the transmission of said response message by a second electronic communication device executing the web application;
  a step of identification, by the processing unit from the sensitive data identification repository, of data to be anonymized in the response message;
  a step of encoding, by the processing unit from the anonymization repository, comprising the generation of anonymized data from previously identified data to be anonymized;

a step of generation, by the processing unit from the anonymized data and from the response message, of an anonymized response message; and a step of sending, by the communication means, the anonymized response message to the third electronic device, said anonymized response message comprising data necessary for analyzing performances of the web application.

Such a method makes it possible to anonymize on the fly production data of a web application as they are being transmitted by the web application to a third electronic device, for example a third-party electronic device. Thus, a user can avoid a tedious step of converting a dataset before implementing a performance test. In addition, the administrator of the web application knows that these data will be anonymized according to predetermined procedures. Thus such a method saves time but also enables analyses most similar to actual conditions. Moreover, the performance analyses can be performed in the first device or in another remote device. This method makes it possible to maintain the entire initial dataset, said initial data being partially confidential, to optimize the anonymization by encrypting a part of the initial data and to maintain the consistency of the initial data in order to be able to perform the desired tests. In particular, this method makes it possible to produce a dataset for the purposes of performance analysis of which only a part of said data is anonymized, only the data described by the anonymization repository are encoded and thus the rest of the data remain "readable". This dataset, created on the fly can thus be used during performance tests whilst conserving data confidentiality.

This selective anonymization of a dataset therefore makes it possible to provide a complete dataset for conducting performance tests on web applications securely/in strict confidence.

According to Other Characteristics of the Method, the Latter May Optionally Include One or More of the Following Characteristics, Alone or in Combination:

it further comprises a step of recording, in a repository of correspondence between data to be anonymized and data anonymized in the data memory, a correspondence between each of the data to be anonymized and each of the corresponding anonymized data. The presence of such a repository and of this correspondence record makes it possible to de-anonymize the data more quickly. Alternatively, a de-anonymization algorithm, which is opposite to the algorithm used to anonymize the data, can be used.

it further comprises a step of measuring a plurality of operating parameters of the web application, preferably at least partially from a plurality of anonymized response messages. Moreover, this step may comprise a measurement of resource consumption on the second device using sensors. Thus it will be possible to monitor the levels of service or more broadly the performances of the web application over time.

it further comprises a step of generating at least one performance indicator value of the web application. This generation step may be performed by the first computer communication device or by another device such as the second computer communication device. Thus, a user can have clear information about the performances of the web application.

it further comprises a step of generating at least one load plan comprising at least one benchmark scenario capable of enabling a plurality of request messages to be generated. This automated generation, for example from previous data, offers significant time savings within the framework of the performance analysis.

the load plan is previously saved in a data memory of the third electronic communication device responsible for performing the web application performance test. Thus the calculation of a load plan is performed from a device separate from the electronic device running the Web application.

It further comprises a step of injecting an application load relating to the benchmark scenario, said step of injecting the application load being carried out by an injection module of the third electronic communication device. Thus the load is controlled from a device separate from the electronic device running the Web application.

the application load makes it possible to simulate an activity of the web application through requests addressed to the web application and in that these requests are intercepted by the first electronic communication device. Thus the first electronic communication device is independent of the third electronic communication device.

It comprises a step of comparing data in a request message with the correspondence repository, and, when said request message does not contain any anonymized data, transmission, by the communication means, of the request message to the second electronic communication device. Such a feature facilitates a real interaction with the Web application during the performance analysis without any disclosure of sensitive information.

It comprises identification of an anonymized data item in the request message followed by a step of restoring an anonymized (i.e. encoded) data item, said restoration step comprising, for example from the correspondence repository, the substitution in the request message of an anonymized data item by a corresponding data item to be anonymized in order to generate a restored request message. Such a feature facilitates a real interaction with the Web application during the performance analysis without any disclosure of sensitive information.

the encoding step corresponds to an anonymization and/or to a pseudonymization of all or part of the data to be anonymized. In particular pseudonymization makes it possible to carry out a performance analysis according to best practices which would not be possible if the data were completely encrypted.

Other implementations of this aspect comprise computer systems, devices and corresponding computer programs stored on one or more computer storage devices, each being configured to perform the actions of a method according to the invention. In particular, a system of one or more computers may be configured to perform specific operations or actions, notably a method according to the invention, thanks to the installation of software, firmware, hardware or a combination of software, firmware or hardware installed on the system. Moreover, one or more computer programs can be configured to perform specific operations or actions thanks to instructions which, when they are executed by a data-processing device, force the device to perform the actions.

Thus, the invention further relates to a computer program product comprising one or more instructions that can be interpreted or executed by a processing unit of an electronic communication device, the interpretation or execution of said instructions by said electronic communication device causing the implementation of a method for analyzing performances of a web application according to the invention.

The invention further relates to an electronic communication device for analyzing performances of a web application configured to execute a process of on-the-fly anonymization of production data, said production data being generated following a benchmark request message, preferably from a third electronic device, transmitted to said web application, said electronic communication device comprising:
- a communication means configured to receive a response message to the benchmark request message, following the transmission of said response message by a second electronic communication device executing the web application;
- a data memory configured to store a sensitive data identification repository and an anonymization repository, and
- a processing unit configured to analyze said benchmark request messages and to carry out a process of on-the-fly anonymization of the production data, said processing unit being particularly configured to:
  Identify, from the sensitive data identification repository, data to be anonymized in the response message;
  Generate, from the anonymization repository, anonymized data from previously identified data to be anonymized; and
  Generate, from the anonymized data and from the response message, an anonymized response message;

said communication means being also configured to send the anonymized response message to the third electronic device, said anonymized response message comprising data necessary for analyzing performances of the web application.

The invention further relates to a system for analyzing performances of a web application comprising:
- an electronic communication device configured to execute the web application to be analyzed and to receive a benchmark request message and/or to transmit a response message to a request;
- an electronic communication device for analyzing performances of a web application according to the invention.

Moreover, such a system comprises a third electronic device configured to transmit the benchmark request message and to receive the response message which is preferably anonymized.

Other benefits and features of the invention will become apparent upon reading the following description, given by way of an illustrative and non-limiting example, with reference to the accompanying drawings.

Some aspects of the present invention are disclosed with reference to flow charts and/or to functional diagrams of methods, apparatuses (systems) and computer program products according to embodiments of the invention.

In the drawings, the flow charts and functional diagrams illustrate the architecture, the functionality and the operation of possible implementations of systems, methods and computer program products according to various embodiments of the present invention. In this respect, each block in the flow diagrams or block diagrams may represent a system, device, module or code, which comprises one or more executable instructions to implement the specified logical function(s). In some implementations, the functions associated with the blocks may appear in a different order than that shown in the figures. For example, two blocks shown in succession may, in fact, be executed substantially simultaneously, or the blocks may sometimes be executed in the reverse order, depending on the functionality involved. Each block in the block diagrams and/or flow diagrams, and combinations of blocks in the block diagrams and/or flow diagrams, may be implemented by special hardware systems that perform the specified functions or execute or perform combinations of special hardware and computer instructions.

DESCRIPTION OF THE INVENTION

In the remainder of the description, "electronic communication device" is understood to mean any computer device or any computer infrastructure comprising one or more hardware and/or software resources configured to send and/or receive request messages and to store information relating to said request messages able to run an application or an application chain. The computer structure may be one or more servers and may, for example, be composed of a presentation server, a business server and a data server. The electronic communication device may also be a "test" server with the same resources as a production server or even a clone of a virtual production server. Preferably, a computer structure is a server.

The expression "web application" within the meaning of the invention designates an application that can be manipulated online via a web browser and which does not therefore need to be installed on client machines.

The expression "on-the-fly anonymization of production data" within the meaning of the invention, corresponds to dynamic anonymization of the production data, notably following a response message to a request transmitted by an electronic communication device, such as a web client, sent to a third-party electronic communication device, such as a proxy client.

The expression "benchmark request message" corresponds, within the meaning of the invention, to the act of sending, via a benchmark application, to an electronic communication device such as a web server, a HTTP message, for example in HTML format. A "restored request message" within the meaning of the invention corresponds preferably to a request message sent to the application of which the content has been modified by the technology according to the invention in order to replace anonymized data with the corresponding sensitive data.

A "response message" generally corresponds according to the invention to the response made by the web application to the benchmark request message. An "anonymized response message" will then correspond to a response message for which the sensitive data (i.e. data to be anonymized) have been replaced with anonymized data.

Within the meaning of the invention, "sensor" or "computer sensor" is understood to mean software associated with a device that makes it possible to perform, manage and feedback to a computer system measurements intended to provide information about, among others, parameter values concerning quality of service, the working order of the resources or the use of the resources.

For the purposes of the invention, "predetermined load plan" is understood to mean a configuration file for the load or constraint to be applied to a computer device or to a computer infrastructure. The configuration file may for example be a file, or a set of files, which makes it possible to associate several data or fields. This association of fields is also called a load record. Such a load configuration file is, for example, an XML file, a CSV file, an INI file, a JSON file, etc. A load configuration file can comprise one or more load records. It may be generated based on information entered by a user.

"Resources" are understood to mean hardware resources such as parameters, capacities or functions of computer devices that make it possible for a web application to function. A single computer device is generally associated with several resources. For example, the term "resource" may include physical or virtual resources such as network drives characterized for example by their inputs/outputs (I/O), reading/writing to disks, the memory usage rate, a network characterized by its bandwidth, a processor characterized for example by its use (as a percentage) or the occupancy rate of its caches, RAM characterized by the quantity allocated, or more generally the latency time of a process or the packet losses.

For the purposes of the invention, "resource use level" is understood to be a value representing the consumption or the occupancy of said resource during the operation of a web application. For example, the usage value may correspond for network drives to their inputs/outputs, the reading/writing to the disks, the memory usage rate, for a network to its bandwidth, for processors to their use (as a percentage) or to the occupancy rate of the caches, for the RAM to the quantity used and for ports, the number of ports having been opened simultaneously throughout the method. The usage value is advantageously reduced to the percentage of the resource level.

The expression "level of service" within the meaning of the invention corresponds to a quality of service to which a third-party can commit and thus guarantee good performances for the critical applications of an organization. Thus, the level of service may correspond to objective criteria such as response rates and times associated with a web application or subjective criteria, and take for example the form of a scale of values, numerical or otherwise, corresponding to an assessment of the quality of the level of service. The level of service may correspond to one or more values.

The expression "data transformation", within the meaning of the invention, refers to any technique aiming to anonymize a dataset. Data transformation may thus correspond to a data-encryption technique, the function of which is to render such a dataset unreadable or at the very least intelligible, or even to a technique for encoding a dataset the function of which is to replace the data with third-party data whilst maintaining the readability and intelligibility of the dataset. By way of example, data encoding can correspond to a pseudonymization technique.

"Performance indicator" is understood to mean the return to a user, notably via a suitable man-machine interface, of a graphics rendering following the completion of a performance test. Such a performance indicator may take the form of one or more values translating the performance level of the web application or the level of use of one or more resources. These performance indicators may be displayed in the form of a graph detailing the evolution in their values over time and over the course of the test phase.

The term "injection", within the meaning of the invention, may correspond to the sending of request messages addressed to a web application, said request messages being intercepted by an electronic communication device configured to analyze and de-anonymize the anonymized data included in said messages.

To "process", "calculate", "determine", "display", "extract", "compare" or more broadly, an "executable operation", within the meaning of this invention, means an action executed by a device or processor unless otherwise indicated. In this respect, the operations relate to actions and/or processes in a data-processing system, for example a computer system or electronic computing device, which manipulates and transforms data represented as physical (electronic) quantities in the memories of the computer system or other devices for storing, transmitting or displaying information. These operations can be based on applications or software programs.

The terms or expressions "application", "software program", "program code" and "executable code" mean any expression, code or notation in a set of instructions designed to produce data processing to perform a particular function directly or indirectly (e.g., after a conversion operation to another code). Examples of program code can include, not limited to, a sub-program, a function, an executable application, a source code, an object code, a library and/or any other sequence of instructions designed for execution on a computer system.

For the purposes of this invention, "processor" means at least one physical circuit configured to execute operations according to the instructions contained in a code. The physical circuit can be an integrated circuit. Examples of a processor include, but are not limited to, a central processing unit, a graphic processor, an application-specific integrated circuit (ASIC) and a programmable logic circuit.

For the purposes of the invention, the expression "man-machine interface" corresponds to any element that allows a human being to communicate with a computer in particular, and without this list being exhaustive, a keyboard, and means making it possible, in response to the orders entered on the keyboard, to effect displays and optionally to select elements displayed on the screen using the mouse or a touchpad. Another exemplary embodiment is a touchscreen that makes it possible to select, directly on the screen, the elements touched by the finger or an object, and optionally with the possibility of displaying a virtual keyboard.

In the remainder of the description, the same reference signs are used to designate the same elements.

In general, benchmark processes are generally required in the context of creating a web application but also throughout its use. In particular, these processes make it possible, for a web application and the computer device supporting it, to detect performance limitations, weaknesses, and consequently make it possible to determine the corrections to be made, as well as to quantify the gains resulting from these possible corrections.

In this regard, there are various benchmark tools (or software) which make it possible to simulate various usage scenarios of a target computer device in order to detect the faults therein. Among these tools, it is possible to cite, by way of example, the WebLOAD® tool (by RADVIEW®), the LoadRunner® tool (by HP®), the Rational Performance Tester® tool (by IBM®), the SOAtest® & LoadTest® tool (by PARASOFT®), the TOSCA-Testsuite® tool, or the JMeter® tool (open source software published by the Apache® Software Foundation).

Generally supplied as part of a benchmark kit, these tools make it possible, in fact, to stress an information system by injecting one or more loads. Such a load may correspond to the simultaneous sending of requests, in accordance with predefined scenarios and different instantiations of these scenarios. Notably, these different types of scenarios may include the simulation of errors by reproducing anomalies, this type of test generally requires a very high volume of production data. In most cases, these performance tests are performed on datasets which have previously been anonymized.

However, the prior anonymization of a dataset is very time-consuming and limits the performance test possibilities. Thus, the inventors have developed a method and a performance device comprising on-the-fly anonymization of data, in particular production data.

Figure 1:
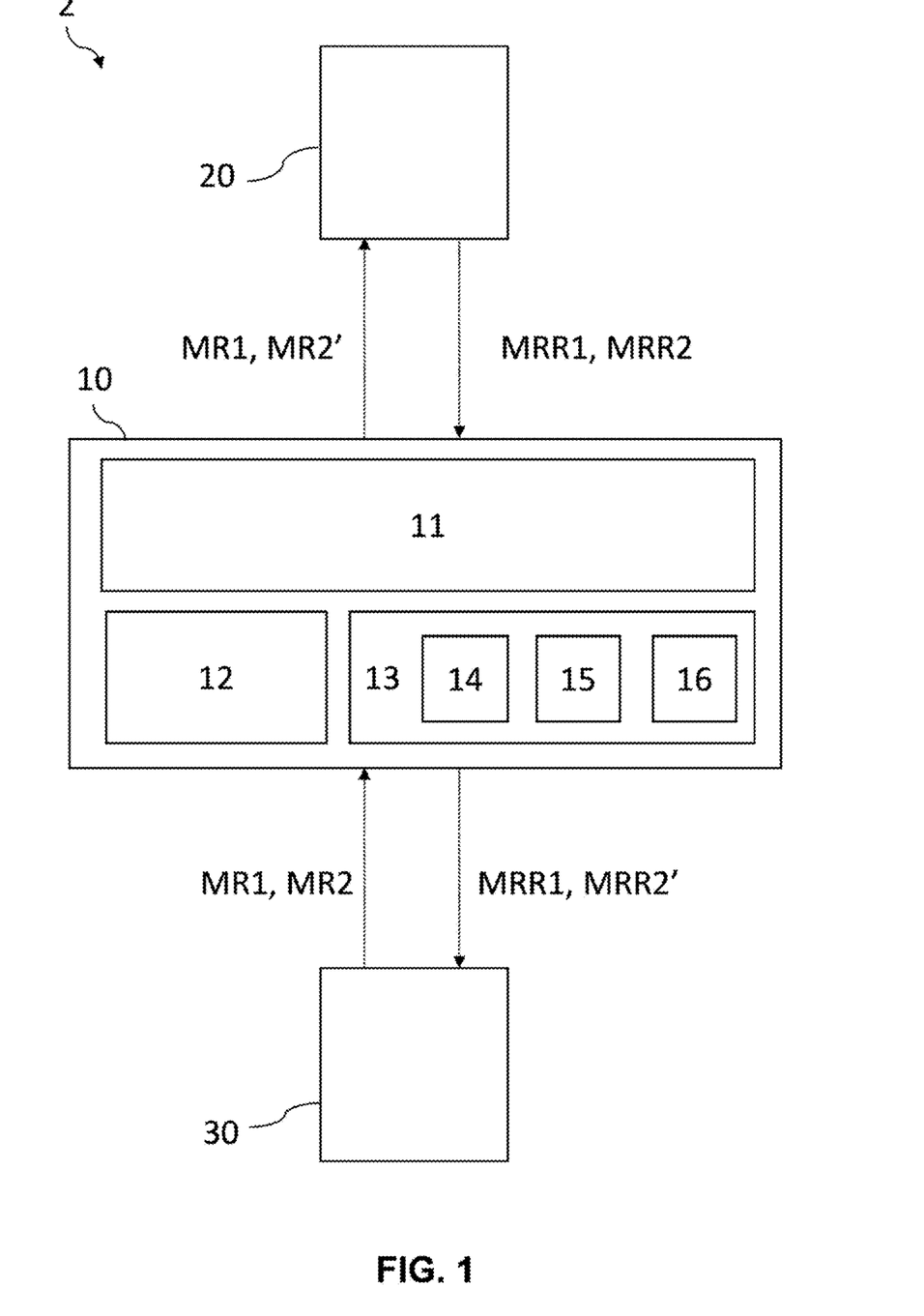
FIG. 1 represents a functional diagram of a system for analyzing performances of a web application.

Thus, according to a first aspect, the invention relates to an electronic communication device 10 for analyzing performances of a web application. In particular, and as illustrated in FIG. 1, an electronic communication device 10 for analyzing performances of a web application according to the invention may comprise a processing unit 11, a communication means 12 and a data memory 13.

The processing unit 11 may comprise a processor for the execution of at least one function of analyzing and processing a request message. Moreover, the processing unit 11 may comprise or be coupled with other means such as combinations of processors, memory as well as codes supporting instructions or with a data memory comprising a plurality of stored repositories. The processing unit 11 may in particular be configured to analyze said benchmark request messages (MR1, MR2) and/or response messages MRR1, MRR2. Moreover, it may carry out a process of on-the-fly anonymization of the production data. The processing unit 11 being in particular configured to identify, from the sensitive data identification repository 14, data to be anonymized in the response message MRR1, MRR2; to generate, from the anonymization repository 15, anonymized data from previously identified data to be anonymized; and to generate, from the anonymized data and from the response message MRR2, an anonymized response message MRR2'.

The communication means 12 is able to exchange data with third-party devices. The communication means 12 may correspond to any element or combination of elements enabling a user to transmit requests, via or by means of a communication network (for example LAN, WLAN, or PAN, database log, email), to third-party devices. Advantageously, it is configured to receive a benchmark request message MR1, MR2 and/or a response message MRR1, MRR2 and to transmit a benchmark request message which may be restored MR2' or not MR1 and/or a response message to a request which may be anonymized MRR2' or not MRR1.

The data memory 13 is advantageously configured to store a sensitive data identification repository 14 and an anonymization repository 15. Moreover, it may be configured to store a repository of correspondence 16 between sensitive data and anonymized data. The data memory 13 may comprise a transient memory and/or a non-transient memory. The non-transient memory may be a medium such as a CD-ROM, a memory card, a local hard drive or a hard drive hosted by a remote server. Preferably, the data memory 13 takes the form of a local hard drive. The data memory 13 is notably able to save, for example in the form of one or more files, data generated by a MMI (Man Machine Interface) or by consumption sensors or even data acquired via another module. The stored data may have been entered, as soon as the device was switched on according to the invention or over time, by a user via an MMI.

The electronic communication device 10 according to the invention is dedicated in particular to analyzing performances of a web application which will generally be hosted on an electronic communication device such as a computer infrastructure. Thus, according to another aspect, the invention relates to a system 2 for analyzing performances of a web application. An example of a system 2 for analyzing performances of a web application according to the invention is shown in FIG. 1. In addition, an electronic communication device 10 for analyzing performances of a web application according to the invention, such a system may comprise a second electronic communication device 20 configured to execute the web application to be analyzed and to receive a benchmark request message, which may be restored MR2' or not MR1, and/or to transmit a response message to a request MRR1, MRR2.

In particular, the second communication device may correspond to a computer infrastructure comprising one or more servers.

Advantageously, such a system may comprise a third electronic communication device 30 configured to carry out performance tests on a web application and to receive a response message, which may be anonymized MRR2' or not MRR1, to a benchmark request.

It is for example within such a system that a method according to the invention can be executed. In fact, according to another aspect, the invention relates to a method 1 for analyzing performances of a web application comprising a process of on-the-fly anonymization 400 of production data. Such a method may be carried out by a first electronic device as described above. Alternatively, it may also be carried out by a first electronic device and a second electronic device as described above.

Figure 2:
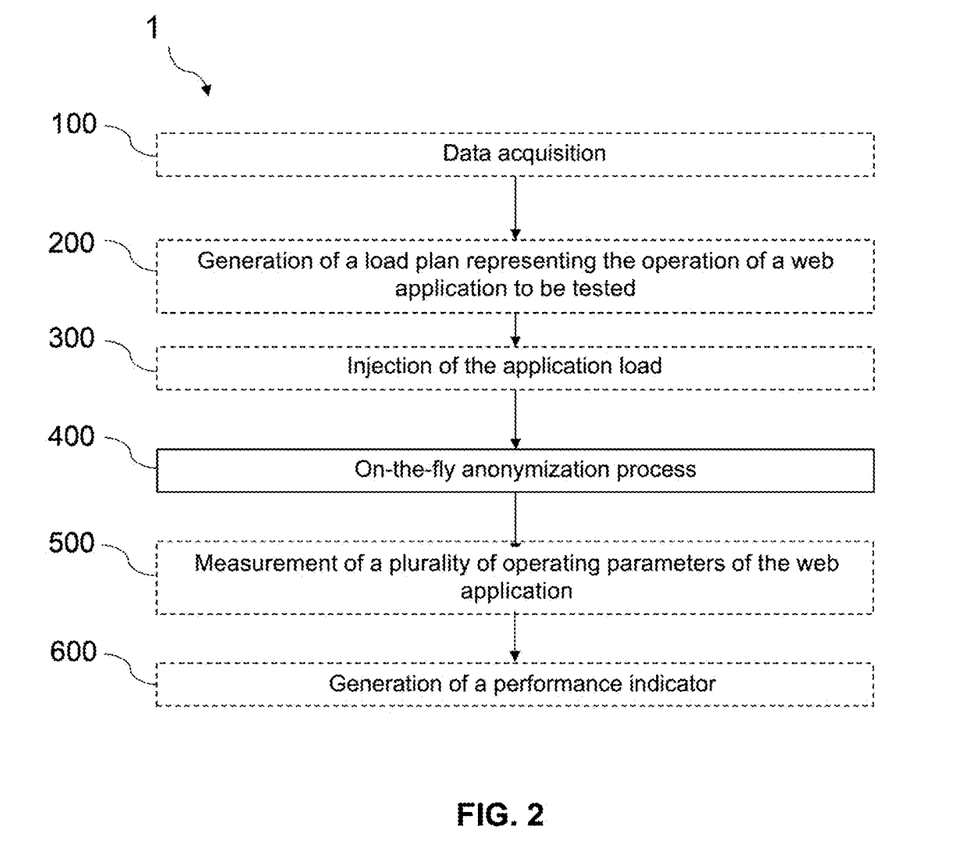
FIG. 2 represents a diagram of the various steps of a method for analyzing performances of a web application according to the invention. The steps in dashed boxes are optional.

As shown in FIG. 2 and as will be detailed below, a method according to the invention comprises a step of on-the-fly anonymization processing 400 of the production data of a web application.

Moreover, it may comprise steps of acquiring 100 data, of generating 200 a load plan, of injecting 300 an application load, of measuring 500 a plurality of operating parameters of the web application, and of generating 600 at least one performance indicator value for the web application.

Such a method advantageously comprises a data-acquisition step 100. This acquisition step 100 can for example be performed by a processing unit of an electronic communication device 30.

This acquisition step 100 corresponds for example to loading the parameters and operating rules making it possible to carry out the method. This step can be performed just before the following steps of the method. This data-acquisition step 100 more particularly comprises the loading of data, preferably stored on a data memory of the electronic communication device responsible for carrying out the performance test of the web application. The data acquired may include data for identifying resources used and of their maximum level of use by the computer device running the tested web application, data corresponding to predetermined thresholds of service quality parameters, beyond which the tested web application is considered to be failing, resource consumption rules and a predetermined load plan representative of the operation of the tested web application.

Once the data-acquisition step 100 is completed, a method according to the invention may comprise a step of generating 200 a load plan. This step of generating 200 a load plan may for example be carried out by a processing unit 11 of an electronic communication device 30.

As described previously, a load plan may be previously saved on a data memory of the electronic communication device responsible for carrying out the performance test on the web application. Thus, a plurality of load plans may be saved in such a data memory, each load plan being able to be associated with a particular benchmark scenario, such as a non-regression test, a limit search test notably associated with a maximum user load or even with a processing speed, an endurance test consisting of determining the maintenance of the performance limits over time before performance deviations appear, a "crash" test aimed at analyzing the behavior of one or more servers on which the web application is run. Thus, a load plan may be representative of the standard operation, or of the nominal load, of the web application to be tested, or may be used to create stresses on the computer device simulating the activity and therefore the use of resources by the web application to be tested, such as according to the aforementioned benchmark scenarios described. The nominal load corresponds to the ongoing activity on the application or the load usually observed during production for the web application. This may correspond for example to a distribution of different types of scenarios reproducing the main actions involved in running the web application, with for example how many scenarios per hour of each type should be played in order to mimic the operation of the web application.

Thus, a load plan may advantageously comprise values on the following parameters: the different types of scenario, the weighting of each of these business scenarios (e.g. the relative proportion of one compared with the others), and the overall load level (e.g. the target volume or the desired rate of requests during the method). In an equivalent manner, it may include information about the number of scenarios of each type executed simultaneously, for example during one hour. It may also include information about the computer device tested.

A load plan may thus be characterized by a set of requests, generally saved in a load command file comprising the code which must be executed. The execution of the load command file may produce a certain number of requests capable of initiating actions as diverse as the creation, consultation, modification, deletion of files or the printing, copying and displaying of data. These actions will be generally similar to the main business actions handled when using the web application. Thus, as will be explained below, a method according to the invention may also comprise a step of injecting an application load.

Advantageously, a load plan may comprise an application load repository configured to store fields relating to the start date of the load, this is, for example, an absolute date assessed relative to an internal clock of the computer device performing the test of the web application or a date relative to the start of a test scenario. It may also comprise the end date of the load or the duration of the load, for example a number of seconds.

Following the generation of a load plan, a method 1 for analyzing performances of a web application may comprise a step of injecting 300 the application load relating to a previously determined benchmark scenario. Said step of injecting 300 the application load may be carried out by an injection module supported by an electronic communication device.

The load data, contained in the load plan, may be used by the injection module in order to produce a load plan making it possible to simulate an activity of a web application with for example the opening and sending of files, back-ups or even browsing on the Internet.

The computer device is subjected to application load preferably by using injection mechanisms such as JMeter®, Tsung® or Gaffing®. Preferably, this is carried out by injecting requests according to a predetermined load plan.

During the injection step, an electronic device such as the third electronic communication device will send requests addressed to a web application and these requests will advantageously be intercepted by the first electronic communication device. To facilitate the continuous use of production data from the web application to be tested, a method 1 for analyzing performances of a web application in accordance with the invention comprises a process of on-the-fly anonymization 400. The process of on-the-fly anonymization 400 may be carried out by a processing unit 11. This processing unit may be integrated into the electronic communication device 20 hosting the web application or else be remote in an electronic communication device 10, which may notably take the form of a proxy server. The anonymization process 400 generally follows the step of injecting 300 the application load.

To enable compliance with confidentiality policies relating to a specific business aspect, it is advisable to proceed with anonymization of all or part of the production data used to perform a performance test. Such a business aspect may for example correspond to a set of pre-established rules from which sensitive data will be determined.

Thus, the anonymization process may comprise a transformation of sensitive data originating from production data, according to any suitable data-transformation technique. Advantageously, such a transformation may correspond to any data-encryption technique aiming to render the latter incomprehensible during their reading by a third-party device, notably an electronic communication device 30. Preferably, such a transformation of sensitive data originating from the production data may correspond to any encoding technique in order to maintain consistency between sensitive data and the corresponding transformed data and to facilitate their comprehension during their reading by a third-party device, notably an electronic communication device 30. In fact, in order to conduct performance tests, it may be essential for at least part of the encoded data to be accessible, the encoding of sensitive data thus makes it possible to substitute the sensitive data with anonymized data of the same nature. By way of a non-limiting example, sensitive data relating to a male first name may be encoded such that it is replaced by encoded data (i.e. anonymized) relating to another male first name and thus not making it possible to identify the person.

As previously described, the step of injecting 300 an application load may correspond to sending one or more request messages. Such request messages may consist of a request transmitted under the HTTP ("Hypertext Transfer Protocol") communication protocol coding a GET command for example. Thus, a process of on-the-fly anonymization 400 may preferably comprise a modification of a request, for example of HTML type transmitted via a HTTP communication protocol, before its transmission to the Web application subjected to the performance test.

Figure 3:
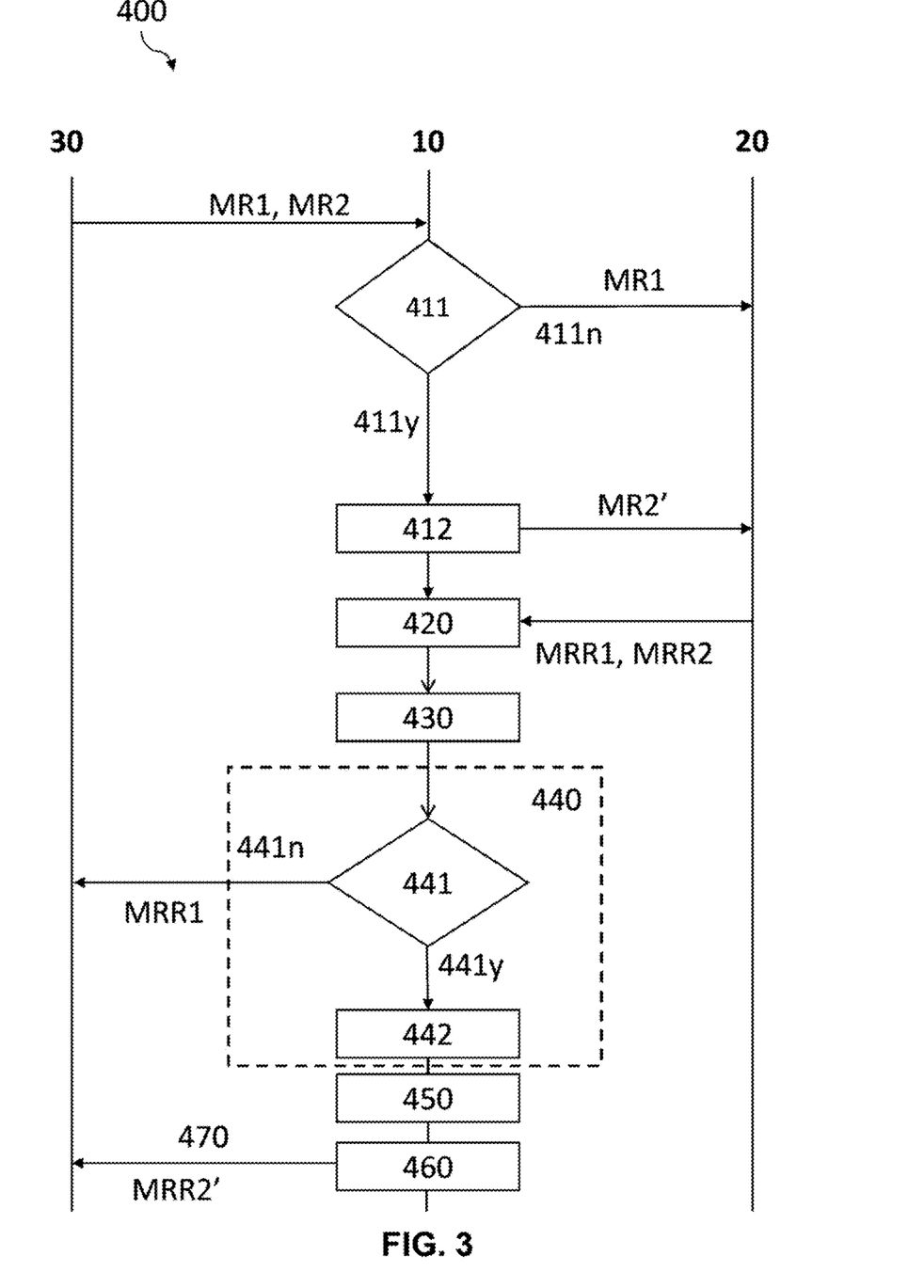
FIG. 3 represents a diagram of an anonymization process of a method for analyzing performances of a web application according to the invention.

One embodiment of an anonymization process will now be explained in connection with FIG. 3.

An anonymization process 400 according to the invention may comprise a step of comparing 411 data from a request message MR1 to a repository of correspondence 16 between sensitive data and anonymized data following receipt of said request message previously sent by an electronic communication device 30. This advantageously makes it possible to identify one or more anonymized data items.

Thus, if the comparison step 411 does not make it possible to identify anonymized data, the request message MR1 is transmitted directly 411n by the communication means 12 of the first electronic communication device 10 to the second electronic communication device 20. When initiating the sending of a request message MR1, the latter may code a request to access a homepage of the web application to be tested to the first electronic communication device 10. We will assume that during the initialization of the sending of a request message MR1, the latter contains no anonymized data.

On the other hand, during a performance test, multiple request messages are generally exchanged. Access to these production data is often necessary in order to carry out a method for analyzing performances of a web application.

Let us assume that the second electronic communication device 20 comprises a server containing business data associated with the medical field, such as, by way of non-limiting examples, data for reimbursing medicinal products prescribed by an attending physician for a given individual, the surname, first name, date of birth, gender or even the social security number associated with said individual.

Thus, a request message MR2 can comprise one or more anonymized data items, for which a correspondence between each anonymized data item and the correspondence repository 16 may be identified 411y during the comparison step 411.

The identification of anonymized data is followed by a step of restoration 412 of a data item to be anonymized, by comparing each previously anonymized data item identified with the correspondence repository 16 in order to identify the corresponding data which had previously undergone an anonymization. To illustrate such an identification, let us assume that a first request message encoding a command to access the medical data of individuals had been previously transmitted and that these data, once anonymized had been communicated to the electronic communication device 30. The request message MR2 may for example correspond to a request message encoding data controlling an access to reimbursements and to medicinal products associated with a given individual, one example of which is shown hereafter.
<MR2
<Reimbursement: ?
<Medicinal product: ?
<Social Security Number: 1 89 08 01 007 117 15

In the present case, the social security number identified during step 411 corresponds to an anonymized data item. During the restoration step 412, the sensitive data (i.e. data to be anonymized) which had been previously identified and saved in the repository of correspondence between a sensitive data item and an anonymized data item will thus make it possible to generate a restored request message MR2' comprising the corresponding restored data. An example of a restored request message MR2' comprising such a restored data item, in the present case, the social security number, is given below.
<MR2'
<Reimbursement:?
<Medicinal product: ?
<Soc_Sec_No.: 1 90 06 06 069 143 18

The restored request message MR2' is then transmitted to the electronic communication device 20.

Regardless of whether a request message comprises anonymized data MR2 or not MR1, the transmission of a request message MR1 or of a restored request message MR2', the second electronic communication device 20 is able to read the data of said request message and to transmit a response message MRR addressed to the electronic communication device 10.

Let us now assume that said response message MRR1, MRR2, contains data relating to all the prescriptions of medicinal products for the individual in question. Said second electronic communication device 20 then transmits to the first electronic communication device 10, the response message MRR comprising the corresponding data, an example of which is shown hereafter.
<MRR2
<Surname: Dupont
<First name: Jean
<Age: 29
<Sex: M
<Reimbursement: _____
<Medicinal product: _____
<Social Security Number: 1 90 06 06 069 143 18

The response message MRR shown above thus presents an example of data encoded by a response message MRR, the data of a single individual are represented even though said response message MRR can comprise a plurality of data associated with several individuals or with several medicinal products. The first electronic communication device 10 thus receives 420 said response message MRR1, MRR2 and an identification step 430 carried out by the processing unit 11 of the electronic communication device 10, will make it possible to identify the data to be anonymized by comparing the data originating from the response message MRR1, MRR2 with the sensitive data identification repository 14 of said electronic communication device 10. Advantageously, such a sensitive data identification repository may be configured in order to respect best practices. In the example given here, one best practice may consist of associating a data item identified as being deemed sensitive or not. In the response message MRR1, MRR2 presented, all the data, except the data associated with the sex of the individual and with the prescriptions, are considered to be sensitive.

During said identification step 430, the identified sensitive data relating to the fields associated with the Surname, First name, age and social security number will then be anonymized during an encoding step 440 carried out by the processing unit 11 of the electronic communication device 10. Such a step 440 may comprise a comparison 441 of said identified sensitive data with the anonymization repository 15.

If the comparison 441 does not make it possible to identify a sensitive data item then the data present in the response message MRR1 are directly transmitted 441n, in a response message to a request MRR1 without being anonymized, by the communication means 12 to the third electronic communication device 30.

Advantageously, the anonymization of the identified sensitive data may correspond to an encoding of said sensitive data according to known data-transformation techniques. According to a preferred embodiment, the identified sensitive data may be anonymized according to previously configured best practices.

On the other hand, if the comparison 441 makes it possible to identify 441y sensitive data, said identified sensitive data are thus anonymized during a transformation step 442. The anonymization of each of the sensitive data fields previously identified may be subject to specific encoding. For each field associated with a sensitive data item, the anonymization repository may generate new replacement data respecting best practices. By way of example, depending on the sex of the individual, the data item associated with the first name will be replaced with a data item associated with a male first name. Modification of the data item associated with the age of the individual will also result in the modification of the social security number on the one hand to maintain data confidentiality and on the other hand to maintain consistency within the data to conduct the performance tests. In a similar manner, modifying the sex of the individual, if this was to be considered sensitive data, would also result in the modification of the social security number.

An example of data anonymization in the response message MRR is shown below.

<MRR2'
<Surname: Pierre
<First name: Martin
<Age: 30
<Sex: M
<Reimbursement: ______
<Medicinal product: ______
<Soc_Sec_No.: 1 89 08 01 007 117 15

Once the data are anonymized, a method 1 for analyzing performances in accordance with the invention comprises a step of recording 450 in a repository of correspondence 16 between the anonymized data, i.e. the data present in the response message MRR2', and the identified sensitive data, i.e. the data present in the response message MRR2. The anonymized data thus saved will be easy to decode thereafter. Said recording step is followed by a step of generating 460, by the processing unit 11 of the electronic communication device 10, an anonymized response message MRR2', and then by a step of sending 470 by the communication means 12 of the first electronic communication device, said anonymized response message addressed to the third electronic communication device 30.

Whether it is a response message to a request MRR1 or a response message to an anonymized request MRR2', the latter contain data necessary for analyzing performances of the web application, notably related to measurements taken by the sensor or sensors. The data necessary for analyzing performances of the web application may correspond to all the data which as such or of which the associated metadata (frequencies, size, speed, etc.) may be used in a performance test.

Moreover, a method 1 for analyzing performances in accordance with the invention may comprise a step of measuring 500 a plurality of operating parameters of the web application. The step of measuring 500 a plurality of operating parameters may be carried out by sensors and/or a module for collecting metrics. In parallel with receiving responses, said responses possibly comprising one or more pieces of information in connection with a resource, to request messages transmitted by an electronic communication device responsible for testing the web application, the method may comprise measuring a plurality of operating parameters of the web application.

The operating parameters of the Web application may correspond to operating parameters in connection with the computer device hosting the Web application or even to parameters relating to the operation of the Web application. Thus, a module for collecting metrics is able to, preferably configured to, measure the resource consumption of the computer device and/or the levels of service of the tested web application. Preferably, the module for collecting metrics is configured to generate measured values of levels of service for the tested web application.

To do this, the module for collecting metrics may use one sensor or a plurality of sensors. The sensor or sensors make it possible to collect data on the resource consumption of the computer device and more particularly of each application structure of which it is comprised. Several resources may be measured in parallel. The sensor or sensors may also be used to measure the levels of service of the web application. The collection module may use a monitoring file comprising rules for collecting metrics. These rules for collecting metrics may specify data that must be recorded during the execution of the web application.

These measurements may for example be performed using a "Nigel's Monitor" (Nmon) or "Performance Monitor" (Perfmon) type sensor. Nmon sensors make it possible for example to display data relating to the CPU, memory, swap file, network, information about the users, the groups, the storage media, the use of the kernel, or the processes consuming the most. Perfmon type sensors make it possible to measure the performances of a computer device. The information collected may for example correspond to resource usage percentages, response times, processing times but also port status, the file system occupancy rate, the running time of the garbage collector for J2EE (Java Enterprise Edition) applications.

These sensors may be associated with each parameter (e.g. resource or functionalities) to feed back the measurement information or metrics, representing for example the working order of the resources and the associated consumption. For each parameter, the sensor or sensors define a parameter identifier and a parameter value. The values of the parameters may be monitored continuously or at configurable intervals in order to obtain information for each parameter as a function of time. This information may be stored in a data memory.

The module for collecting metrics makes it possible to collect and measure the resource consumption and/or the levels of service of the web application or of the computer device hosting the web application.

Moreover, a method 1 for analyzing performances in accordance with the invention may comprise a step of generating 600 at least one performance indicator value for the web application. This step of generating 600 at least one performance indicator value can be carried out by a processing unit of an electronic communication device 30. Advantageously, it follows the step of measuring 500 a plurality of operating parameters of the web application. Moreover, it is generally based on the values of measured operating parameters.

In particular, such an indicator may be generated according to the consumption parameters and/or the levels of service previously measured during step 500. The generation of said indicator is then returned to an operator via a suitable man-machine interface provided in the electronic communication device used to test the web application. The performance indicator can thus take the form of a value reflecting the measurements previously taken, such a value can then mean that the data corresponding to predetermined thresholds for quality of service parameters, beyond which the tested web application is considered to be failing, have been exceeded or, conversely, have not been reached. This may advantageously give an operator an indication of the operation of the web application.

Preferably, a performance indicator according to the invention may take the form of a table of values, or even one or more graphs, presenting the data measured by one or more sensors as a function of time and indicating any cases where a predetermined threshold of consumption and/or quality of service parameters has been exceeded in comparison with the measured data.

In the context of the comparison with the resource consumption measurement data, the maximum predetermined values may for example correspond to predetermined maximum thresholds of use. In the context of the comparison with the level of service measurement data, the maximum predetermined values may for example correspond to thresholds established during the installation of applications. The maximum predetermined values may also be freely set by the information systems department in the context of its policy for managing the performance of its installations. It must be understood that it may be equivalent to use minimum predetermined values instead of maximum predetermined values. This is notably the case for the assessment of levels of service.

Detection of a failure using the measured values of levels of service makes it possible to monitor the performance of the web application and may for example refer to performances observed by the end users of the web application such as for example an average response time.

Thus, the method according to the invention may comprise a failure detection step comprising a comparison of predetermined thresholds for quality of service parameters with the measured values of resource consumption and/or of levels of service for the web application. Moreover, it may comprise an identification of cases where maximum predetermined values have been exceeded by the values measured.

The method according to the invention may also comprise a failure analysis step, said failure analysis step comprising, in the event that a predetermined threshold of a quality of service parameter is exceeded, a behavioral analysis of the web application and a generation of failure data capable of providing information about the nature and/or the source of the failure.

Thus, once a failure has been caused, the method may comprise determining, notably using a module for application performance management, the nature of the failure. The failure may be of numerous types. For example, it may be related to system configuration issues (number of files open, number of ports, etc.) as well as application configuration problems (JMS file, JDBC pool, etc.) or even to web application design problems such as excessive coupling between processes.

Thus, the method preferably comprises selecting the nature of the failure from the following failures:
hardware configuration of the computer device,
software configuration of the computer device,
configuration of the web application, and
design of the web application.

Thus, the solutions proposed in the present invention make it possible to anonymize on the fly the production data of a web application as they are being transmitted by the web application. This selective anonymization of a dataset therefore makes it possible to provide a complete dataset for conducting performance tests on web applications securely/in strict confidence. Moreover, beyond the performance analysis, the invention may help an administrator to correct any failures identified.

The invention claimed is:

1. A method for analyzing performances of a web application comprising
a process of on-the-fly anonymization of production data sent to a third electronic device, said production data being generated following a benchmark request message from the third electronic device that is transmitted to said web application,
wherein said process of on-the-fly anonymization is carried out by a first electronic communication device comprising a processing unit, a communication means, and a data memory configured to store a sensitive data identification repository and an anonymization repository,
said process of on-the-fly anonymization of production data of the web application comprising:
reception, by the communication means, of a response message to the benchmark request message, following transmission of said response message by a second electronic communication device executing the web application;
identification, by the processing unit from the sensitive data identification repository, of data to be anonymized in the response message;
encoding, by the processing unit from the anonymization repository, comprising generation of anonymized data from previously identified data to be anonymized;
generation, by the processing unit from the anonymized data and from the response message, of an anonymized response message; and
sending, by the communication means, the anonymized response message to the third electronic device, said anonymized response message comprising data necessary for analyzing said performances of the web application.

2. The method for analyzing performances of a web application according to claim 1, further comprising recording, in a repository of correspondence between said data to be anonymized and data anonymized in the data memory, a correspondence between each of the data to be anonymized and each of the anonymized data.

3. The method for analyzing performances of a web application according to claim 1, further comprising measuring a plurality of operating parameters of the web application, at least partially from a plurality of anonymized response messages.

4. The method for analyzing performances of a web application according to claim 3, further comprising generating at least one performance indicator value for the web application.

5. The method for analyzing performances of a web application according to claim 1, further comprising generating at least one load plan comprising at least one benchmark scenario capable of enabling a plurality of request messages to be generated.

6. The method for analyzing performances of a web application according to claim 5, wherein the at least one load plan is previously saved in a data memory of the third electronic device responsible for performing a performance test of the web application.

7. The method for analyzing performances of a web application according to claim 5, further comprising injecting an application load relating to the at least one benchmark scenario, wherein said injecting the application load is carried out by an injection module of the third electronic device.

8. The method for analyzing performances of a web application according to claim 7, wherein the application load makes it possible to simulate an activity of the web application through requests addressed to the web application and wherein the requests are intercepted by the first electronic communication device.

9. The method for analyzing performances of a web application according to claim 1, further comprising comparing data in a request message with a repository of correspondence, and, when said request message does not contain any anonymized data, transmitting, by the communication means, of the request message to the second electronic communication device.

10. The method for analyzing performances of a web application according to claim 1, further comprising identification of an anonymized data item a request message followed by restoring an anonymized data item, said restoring comprising, from a repository of correspondence, substitution in the request message of the anonymized data item by a corresponding data item to be anonymized in order to generate a restored request message.

11. The method for analyzing performances of a web application according to claim 1, wherein the encoding corresponds to one or more of an anonymization and a pseudonymization of all or part of the data to be anonymized.

12. A computer program product comprising one or more instructions that are interpreted or executed by a processing unit of an electronic communication device, wherein interpretation or execution of said one or more instructions by said electronic communication device causes implementation of a method for analyzing performances of a web application comprising
    a process of on-the-fly anonymization of production data sent to a third electronic device, said production data being generated following a benchmark request message from the third electronic device that is transmitted to said web application,
    wherein said process of on-the-fly anonymization is carried out by a first electronic communication device comprising the processing unit, a communication means, and a data memory configured to store a sensitive data identification repository and an anonymization repository,
    said process of on-the-fly anonymization of production data of the web application comprising:
        reception, by the communication means, of a response message (to the benchmark request message, following transmission of said response message by a second electronic communication device executing the web application;
        identification, by the processing unit from the sensitive data identification repository, of data to be anonymized in the response message;
        encoding, by the processing unit from the anonymization repository, comprising generation of anonymized data from previously identified data to be anonymized;
        generation, by the processing unit from the anonymized data and from the response message, of an anonymized response message; and
        sending, by the communication means, the anonymized response message to the third electronic device, said anonymized response message comprising data necessary for analyzing said performances of the web application.

13. An electronic communication device for analyzing performances of a web application configured to execute a process of on-the-fly anonymization of production data, said production data being generated following a benchmark request message, from a third electronic device, transmitted to said web application, said electronic communication device comprising:
    a communication means configured to receive a response message to the benchmark request message, following a transmission of said response message by a second electronic communication device executing the web application;
    a data memory configured to store a sensitive data identification repository and an anonymization repository;
    a processing unit configured to analyze one or more of said benchmark request message and said response message, and to carry out a process of on-the-fly anonymization of the production data, said processing unit being configured to
        identify, from the sensitive data identification repository, data to be anonymized in the response message;
        generate, from the anonymization repository, anonymized data from previously identified data to be anonymized; and
        generate, from the anonymized data and from the response message, an anonymized response message;
    wherein said communication means also is further configured to send the anonymized response message to the third electronic device, and wherein said anonymized response message comprises data necessary for analyzing the performances of the web application.

14. The electronic communication device according to claim 13, further comprising said second electronic an electronic communication device configured to execute the web application to be analyzed and to one or more receive the benchmark request message and transmit the response message to a request.

15. The electronic communication device according to claim 14, further comprising said third electronic device that is configured to transmit the benchmark request message and to receive the response message, which is anonymized.

* * * * *